United States Patent
Browning

(10) Patent No.: US 7,417,794 B2
(45) Date of Patent: *Aug. 26, 2008

(54) POLYMER SHEET FOR PROJECTION SCREEN

(75) Inventor: Gary Allan Browning, Long Beach, CA (US)

(73) Assignee: Stewart Filmscreen Corporation, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/834,113

(22) Filed: Aug. 6, 2007

(65) Prior Publication Data

US 2007/0275208 A1  Nov. 29, 2007

Related U.S. Application Data

(63) Continuation of application No. 11/214,429, filed on Aug. 29, 2005, now Pat. No. 7,253,953.

(51) Int. Cl.
*G03B 21/60* (2006.01)
*G03B 21/56* (2006.01)

(52) U.S. Cl. .................... 359/452; 359/454; 359/460

(58) Field of Classification Search ................ 359/452, 359/453, 454, 460, 443
See application file for complete search history.

(56) References Cited

U.S. PATENT DOCUMENTS 7,253,953 B2 * 8/2007 Browning .................. 359/452
2004/0190144 A1 * 9/2004 Hannington ................ 359/614

* cited by examiner

*Primary Examiner*—Diane I. Lee
*Assistant Examiner*—Magda Cruz
(74) *Attorney, Agent, or Firm*—Donald E. Hasse; Hasse & Nesbitt LLC

(57) ABSTRACT

A polymer sheet for use in a projection screen comprises polyorgano silsesquioxane microspheres that enhance light diffusing characteristics. Also disclosed is a projection screen comprising at least two glass plates and the polymer sheet disposed therebetween. Also disclosed is a method of manufacturing a polymer sheet by incorporating the microspheres with the polymer.

20 Claims, 1 Drawing Sheet

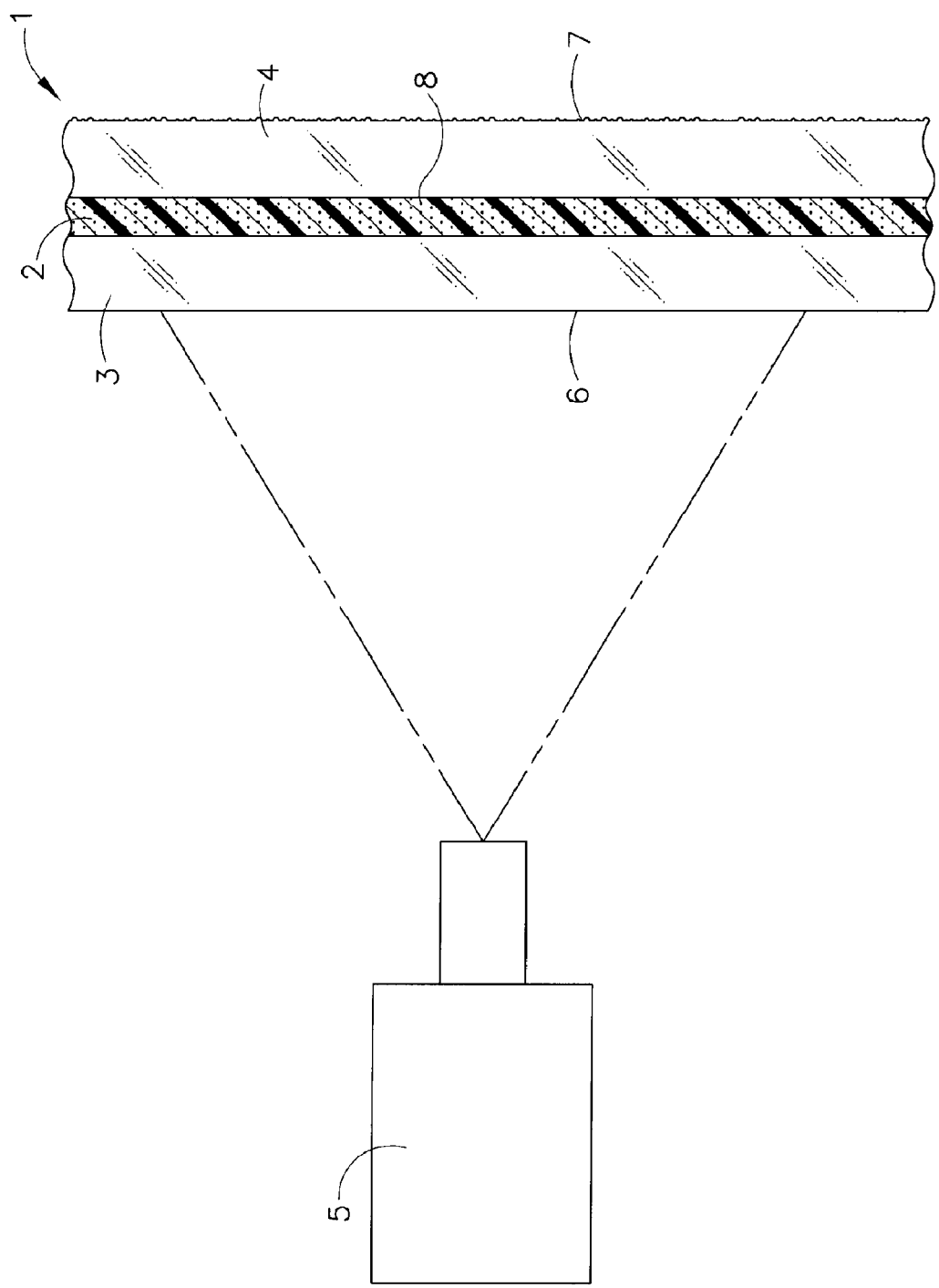

POLYMER SHEET FOR PROJECTION SCREEN

CROSS-REFERENCE TO RELATED APPLICATION

This application is a continuation of U.S. patent application Ser. No. 11/214,429, filed on Aug. 29, 2005, now U.S. Pat. No. 7,253,953 incorporated herein by reference.

TECHNICAL FIELD

This invention relates to a polymer sheet, film or foil (hereinafter referred to as a sheet) for use in a projection screen, such as a laminated rear projection screen. More particularly, the invention relates to a polymer sheet, such as a polyvinyl butyral sheet, comprising polyorgano silsesquioxane microspheres to improve light diffusing characteristics. The invention also relates to a projection screen comprising at least two glass plates and the polymer sheet disposed therebetween.

BACKGROUND OF THE INVENTION

Projection screens, particularly rear, transmission, or back projection screens in which modulated light from a projector is illuminated on the side facing away from the viewer and that light is viewed on the side facing the viewer, are used mainly for presentations, for showing slides, films, and video, for television sets and the like.

U.S. Pat. No. 6,839,167, Eckelt, et al., describes a projection screen that allows viewing of the projected image on the side of the screen facing away from the projector as well as on the side facing the projector. The screen is said to have only a low flicker effect and no light spots or places with excessive gloss. The screen has a first glass plate facing the projector that has a translucent ceramic coating, a second glass plate facing away from the projector that has a surface roughness to prevent reflections, and a white translucent polyvinyl butyral (PVB) sheet therebetween that is said to provide dispersion and partial reflection of the light to achieve best possible reproduction of the image. However, designing the screen to both reflect and transmit light so as to allow viewing from both sides degrades the brightness and contrast of the image to the viewer. It is also not practical to view projected information and data such as text when it is displayed backwards, as would be the case depending on which side of the screen you are viewing.

In the case of a rear projection screen, it is desirable to have high light transmission by scattering and diffusing forward as much light as possible while limiting the amount of light reflection backwards. It is also desirable that the light be spread over a wide viewing area with no visible concentration or hotspot when viewing the screen. It is also desirable to have the projection screen limit ambient light reflecting off the screen so as not to degrade the image contrast. The projection screen must also be able to resolve the individual picture elements or pixels projected. Thicker sheets of polymer (e.g., greater than about 0.060 inches [about 1.524 mm] thick) such as those available for light diffusion with diffusion particles dispersed throughout the sheet appear milky and will not exhibit sufficient resolution or contrast. It is desirable that the screen be easy and inexpensive to manufacture as well as scalable to very large sizes. The screen should also be durable, easy to clean, and able to withstand outdoor exposure.

Advances in projector resolutions are starting to render screen designs, such as plastic lenticular sheets disclosed in U.S. Pat. No. 4,919,515, Hasegawa, et al., more difficult and expensive to manufacture. The lens structure and pitch must be made smaller to accommodate higher resolutions; and they are also prone to moiré, speckle and other screen artifacts. Rear projection screens of the glass beaded type, such as disclosed in U.S. Pat. No. 2,378,252, Staehle, et al., while having good brightness and contrast suffer from an excess amount of mottle or blotch due to variations in the bead diameters. This causes the bead to have incomplete depth in the light absorbing layer and uneven light transmission across the screen. Surface relief holograms, such as disclosed in U.S. Pat. No. 5,609,939, Petersen, et al., while being high in light transmission and able to spread projected light over a wide area, are difficult and expensive to manufacture in larger sizes and are prone to pin hole defects causing excessive bright spots where the light is not diffused.

Many current PVB sheets designed to diffuse light do so by incorporating fine particles or pigments of a different refractive index, such as calcium carbonate, barium sulfate, silica, or quartz, into the PVB resin matrix. Particle size, morphology of the particle, concentration of particle to carrier resin, and the ratio of the refractive indices of the particle and the carrier resin all determine the quantity of scattered light. Typically, the particle size is between about 0.1 and about 10 microns. Too small of a particle size will become transparent to light and will not diffuse. Too large of a particle size and diffusion efficiency diminishes. Spherical particles are preferred as they exhibit a constant size to the projected light no matter what their orientation is within the carrier resin. This results in a more uniform and smooth appearance to the screen. If the contrast of the refractive indices is excessive, more light is reflected back and less is scattered forward. If the contrast is too low, the light is transmitted without being sufficiently scattered or diffused. Typically, the difference in refractive indices between the particles and the carrier resin is from about 0.06 to about 0.14. Particles of a lower refractive index than the resin are preferred. Particles having a higher index than the carrier resin will exhibit more light backscatter. The pigments should also be transparent or translucent so as not to be too opaque to light. Optically dense pigments such as titanium dioxide have a significant amount of light reflection and do not sufficiently scatter and diffuse the light forward. Some pigments are also difficult to disperse into the polymer resin matrix, or have a high specific gravity and settle out of dispersion. In other pigments, the morphology of the particle can significantly raise the viscosity of the resin matrix and make processing difficult. Selection of both pigment and carrier resin that maintains polarity of projected light is also desirable. There are applications with projection displays that utilize polarization of light to separate modulated light signals to two channels or views, one for the left and one for the right eye to show 3D images to the viewer. A polarization extinction ratio of at least about 25:1 is desirable to minimize ghosting or leaking from one channel to the other channel. Extinction ratios of 100:1 and above are preferred. Polymers such as polycarbonate or polyethylene terephthalate (PET) will depolarize light as will pigment such as calcite crystals.

Thus, there is a continuing need for improved polymer sheets that provide good light diffusion with an even appearance and minimal screen artifacts when used in projection screens.

SUMMARY OF THE INVENTION

The invention relates to a polymer sheet comprising from about 85% to about 99.5% by weight of a thermoplastic polymer compound and from about 0.5% to about 15% by weight of dispersed polyorgano silsesquioxane microspheres.

The invention also relates to a projection screen comprising:

a) a first glass plate;
b) a second glass plate; and
c) a polymer sheet layer disposed between the first glass plate and the second glass plate, said polymer sheet comprising from about 85% to about 99.5% by weight of a thermoplastic polymer compound and from about 0.5% to about 15% by weight of dispersed polyorgano silsesquioxane microspheres.

BRIEF DESCRIPTION OF THE DRAWING

In the drawing, a projection screen according to the invention is represented schematically in a partly sectioned side view.

DETAILED DESCRIPTION OF THE INVENTION

The polymer sheet of the present invention comprises from about 85% to about 99.5%, typically from about 90% to about 99%, by weight of a thermoplastic polymer compound having a suitable glass transition temperature. Polymer sheets useful herein are described in U.S. Pat. No. 6,825,255, Yuan et al., incorporated herein by reference. In one embodiment, the polymer sheet comprises polyvinyl butyral, polyurethane, polyvinyl chloride, or poly (ethylene vinyl acetate), or combinations thereof. The sheet typically comprises polyvinyl butyral, polyvinyl chloride, or polyurethane, or mixtures thereof, especially polyvinyl butyral (PVB).

PVB is produced by known aqueous or solvent acetalization processes that involve reacting PVOH with butyraldehyde in the presence of acid catalyst, followed by neutralization of the catalyst, separation, stabilization and drying of the resin. The polymer typically comprises about 13% to about 30% by weight of hydroxyl groups calculated as PVOH, more typically about 15% to about 22% hydroxyl groups calculated as PVOH. The polymer may further comprise up to about 10% by weight of residual ester groups, typically up to about 3% residual ester groups, calculated as polyvinyl acetate, with the balance being an acetal, e.g., butyraldehyde acetal, but optionally including other acetal groups, e.g., a 2-ethyl hexanal-group. Typically, the PVB has an average molecular weight greater than about 70,000 g/mole. PVB is commercially available from Solutia Inc., St. Louis, Mo. as Butvar resin.

The polymer sheets herein have improved light diffusing characteristics due to the addition of an effective amount of polyorgano silsesquioxane microspheres. The organo groups in the microspheres can be methyl, $C_2$-$C_{18}$ alkyl, hydride, phenyl, vinyl, or cyclohexyl, or mixtures thereof. Suitable microspheres are described in U.S. Pat. No. 6,773,787, Maas et al., and in U.S. Pat. No. 5,352,747, Ohtsuka et al., both incorporated herein by reference. The microspheres can be prepared by conventional methods, such as disclosed in F. Brown et al., J. Polymer Sci., Part C, No. 1, p. 83 (1983), in which one or more of the trialkoxysilanes are hydrolyzed with an acid catalyst and condensed.

In one embodiment, the polyorgano silsesquioxane comprises methyl, $C_2$-$C_{18}$ alkyl, hydride, phenyl, vinyl, or cyclohexyl groups, or a combination thereof. Examples include polymethyl silsesquioxane, polyphenyl silsesquioxane, polyphenyl-methyl silsesquioxane, a phenyl silsesquioxane-dimethyl siloxane copolymer in liquid form, polyphenyl-vinyl silsesquioxane, polycyclohexyl silsesquioxane, polycyclopentyl silsesquioxane, and polyhydride silsesquioxane, and combinations thereof.

In another embodiment, the polyorgano silsesquioxane is a polyalkyl siloxane powder material prepared by hydrolysis, polymerization or crosslinking of alkylsilanes or alkylsiloxanes in such a way as to give a defined particulate structure with a surface consisting largely of alkylfunctional silicone atoms. In yet another embodiment, the silicon ladder resin is a poly (methyl silsesquioxane) obtained by hydrolytic condensation in aqueous ammonia or amines of methyltri-alkoxysilanes, or their hydroxylates or condensates. The resin is spherical in shape and forms free-flowing powders, which are low in impurities such as chlorine, alkali metals, or alkaline earth metals.

The polyorgano silsesquioxane microspheres are used in the polymer sheet in a sufficient amount to provide the desired light diffusing properties. In one embodiment, the sheet comprises from about 0.5% to about 15%, typically from about 1% to about 10%, by weight of the microspheres.

The polyorgano silsesquioxane microspheres typically have an average particle size of from about 0.1 to about 10 microns, more typically from about 0.5 to about 7.0 microns. A tight particle size distribution is desired for improved visual appearance and performance. In one embodiment, the microspheres are polymethyl silsesquioxane powder available from Toshiba Silicones under the trade name Tospearl 145, with a mean particle size of about 4.0 microns. In another embodiment, the microspheres are available from Toshiba Silicones under the trade name Tospearl 120, with a mean particle size of about 2.0 microns. The refractive index is about 1.42

The polymethyl silsesquioxane microspheres herein have a low specific gravity and are easily dispersed in the polymer matrix. Moreover, they have a spherical shape and are free flowing so they do not significantly raise the viscosity of the polymer resin matrix during processing and forming into a sheet. The microspheres are efficient at diffusing light forward, but do not significantly reflect light back towards the light source. Low concentrations are often sufficient to completely diffuse the light so that one viewing the glass laminate in front of the light source does not see a significant concentration of light on the screen. It is important that the viewer when looking on axis to the projector light does not detect the position of the light source behind the screen. The microspheres are typically resistant to high temperatures, solvents, and plasticizers, and do not react with the chemistry of the PVB matrix to cause yellowing or other discolorations of the sheet. The microspheres are also not abrasive and do not cause excessive wear to processing equipment as some other pigments do. The resulting polymer sheet can be used in a rear projection screen or other applications that requires a light-diffusing panel, such as in skylights or privacy screens.

The polymer sheets of the present invention may further comprise any additive typically used in such sheets, in conventional amounts. In one embodiment, such additives are present in an amount of from about 0.1% to about 30% by weight of the composition. The use of such additives may be desirable for improved processing of the composition as well as improving the products or articles formed therefrom. Examples of such additives include oxidative and thermal stabilizers, lubricants, mold release agents, flame-retarding agents, oxidation inhibitors, dyes, pigments and other coloring agents, ultraviolet light absorbers and stabilizers, nucleators, plasticizers, compatible plastics, anti-static agents, fillers, and other conventional additives known in the art, and mixtures thereof. The additives may be incorporated at any suitable stage of the production process, and typically are introduced in the mixing step and included in an extrudate.

By way of example, representative ultraviolet light stabilizers include various substituted resorcinols, salicylates, benzotriazole, benzophenones, and the like. Suitable lubricants and mold release agents include stearic acid, stearyl alcohol, stearamides. Exemplary flame-retardants include organic halogenated compounds, including decabromodiphenyl ether and the like, as well as inorganic compounds. Suitable coloring agents, dyes and pigments include cadmium sulfide, cadmium selenide, titanium dioxide, phthalocyanines, ultramarine blue, nigrosine, carbon black and the like. Representative oxidative and thermal stabilizers include the Group I metal halides, such as sodium halides, potassium halides, and lithium halides, as well as cuprous halides, and also chlorides, bromides, and iodides, hindered phenols, hydroquinones, and aromatic amines, as well as substituted members of those above mentioned groups, and combinations thereof. Exemplary plasticizers include lactams such as caprolactam and lauryl lactam, sulfonamides such as o,p-toluenesulfonamide and N-ethyl, N-butyl benzylnesulfonamide, and combinations of the above. Other plasticizers commonly employed are esters of a polybasic acid or a polyhydric alcohol. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890, and adipates such as disclosed in U.S. Pat. No. 4,144,217. Also commonly employed plasticizers are mixed adipates made from $C_4$ to $C_9$ alkyl alcohols and cyclo $C_4$ to $C_{10}$ alcohols, as disclosed in U.S. Pat. No. 5,013,779, e.g., $C_6$ to $C_8$ adipate esters, such as dihexyl adipate.

In one embodiment, the polymer sheet herein comprises, by weight, from about 60% to about 80% PVB, from about 15% to about 30% of plasticizer (e.g., triethyleneglycol bis (2-ethylhexanoate), and from about 0.5% to about 15% of the polyorgano silsesquioxane microspheres (e.g., polymethyl silsesquioxane microspheres).

The polymer, microspheres, and other additives herein are thermally processed and configured into sheet form. One exemplary method of forming a PVB sheet comprises extruding molten PVB resin (hereinafter "melt") comprising the microspheres and other additives by forcing the melt through a sheet die (e.g., a die having an opening that is substantially greater in one dimension than in a perpendicular dimension). Another method of forming a PVB sheet comprises casting molten resin or semi-molten resin comprising the microspheres and other additives from a die onto a roller, solidifying the resin, and subsequently removing the solidified resin as a sheet. In either embodiment, the surface texture at either or both sides of the sheet may be controlled by adjusting the surfaces of the die opening or by providing texture at the roller surface. Other techniques for controlling the sheet texture include varying parameters of the reactant materials (e.g., the water content of the resin and/or plasticizer, the melt temperature, or combinations thereof). Furthermore, the sheet can be configured to include spaced projections that define a temporary surface irregularity to facilitate de-airing of the sheet during lamination processes, after which the elevated temperatures and pressures of the laminating process cause the projections to melt into the sheet, thereby resulting in a smooth finish. The sheet can be made in different thickness, for example, about 0.015 inches (about 0.381 mm) or about 0.030 inches (about 0.762 mm). The sheet can also be layered during lamination to yield thicker forms.

The above polymer sheet can be used in a projection screen made of a laminated glass having at least two glass plates, with the polymer sheet disposed therebetween. For example, the drawing schematically shows a projection screen of the invention in a partially sectioned side view. As shown in the drawing, projection screen 1 comprises two glass plates 3, 4 bonded to each other by means of a layer of polymer sheet 2. Polymer sheet 2 is a translucent sheet of polyvinyl butyral comprising polymethyl silsesquioxane microspheres 8. The glass plate 3 facing a projection device 5 has an outer surface 6 extending at least over the projection area. The glass plate 4 facing away from the projection device 5 has on its outer surface 7 a surface roughness preventing reflections. The glass plate 3 comprises of a glass that is low in iron oxide and the glass plate 4 comprises of silicate glass. In one embodiment, the glass plate 3 is about 0.125 inches (about 3.175 mm) thick, and the glass plate 4 is about 0.125 inches (about 3.175 mm) thick. One or more additional glass plates, with one or more additional polymer sheets between the glass plates, may be added as desired. Thicker glass may also be used for additional structural strength. This has little effect on the optical performance of the screen.

In one example, a PVB sheet 0.015 inches (about 0.381 mm) thick comprises about 10% by weight of Tospearl 120 to PVB resin weight, and about 25-30% of triethyleneglycol bis(2-ethylhexanoate) plasticizer. The sheet performs well in a rear projection screen, with a screen gain of 1.3 and no hot spot or blow through of the projected light. In another example, a 0.030 inch thick PVB sheet comprising about 7% by weight of Tospearl 120 to PVB resin weight, and about 25-30% of triethyleneglycol bis(2-ethylhexanoate) plasticizer performs well in a rear projection screen. The projection screen has a peak gain of 1.1 and a ½ gain viewing angle of over 50 degrees. The Polarization Extinction Ratio (PER) is about 33:1. By utilizing a first glass plate of tinted glass of about 61% visible light transmission, the PER is raised to over 50:1. Adding a light absorbing pigment or dye to the polymer sheet raises the PER even higher, over 100:1. Resolution is still excellent with the thicker sheet.

To improve the contrast of the projected image by absorbing ambient light, it may be desirable to also include a light-absorbing layer in the construction. This can be done with gray glass, additional transparent gray PVB layers, or tinted transparent gray films such as PET included in the layers. The translucent nature of the pigmented PVB sheet allows the projection screen to appear a dark neutral gray color. Other pigments with a higher amount of light backscatter will appear lighter in color, decreasing the contrast of the projection screen. It is also possible to tint the sheet gray by including a light absorbing pigment such as carbon black in the PVB along with the microspheres. In one example with the screen constructed with 3/16 inch (about 4.8 mm) thick gray glass (approximately 50% visible light transmission) as one layer, only about 4.5% of the ambient light is reflected off the screen back to the viewer. A matte white front projection screen will reflect nearly 100% back to the viewer.

For rear projection screens, the concentration of the microspheres should be high enough to diffuse the light so that the viewer cannot discern the projected light source. Thus, a PVB sheet 0.015 inches (about 0.381 mm) thick typically comprises from about 9% to about 10% by weight of the microspheres, and a sheet 0.030 inches (about 0.762 mm) thick typically comprises about 5% by weight of the microspheres. Increasing the concentration of microspheres will decrease the total light transmission but at the same time it will increase the dispersion angle of the diffused light. This is desirable for rear projection screen applications that require edge blending or otherwise uniform brightness. The glass used in the construction can also be enhanced by applying an anti-reflection coating or tinted coating or by etching the glass slightly to reduce surface reflections on the glass that degrade the projected image. For example, the peak-to-valley height of a glass plate with surface roughness may lie in the range of from about 2 to about 5 microns. As mentioned above, the addition of a gray contrast enhancement layer may also be beneficial. For other applications where increased light transmission is desired, lower concentrations of the microspheres can be used.

The combination of the two glass plates with the polymer sheet disposed therebetween prevents a concentrated point of light on the glass surfaces from being produced during incident-light and transmitted-light projection, which would prevent a clear projection image. Instead, the cone of light produced by the projector on the glass surface is dispersed by the microspheres so that no disturbing concentrated point of light is produced and the projected image can be clearly seen. Moreover, the projected image is not falsified in its color and is presented in a uniformly sharp and undistorted way.

Various embodiments of this invention have been described. However, this disclosure should not be construed as a limitation on the scope of the invention. Accordingly, various modifications, adaptations, and alternatives may occur to one skilled in the art without departing form the spirit and scope of the claimed invention.

What is claimed is:

1. A polymer sheet comprising a mixture of from about 85% to about 99.5% by weight of a thermoplastic polymer compound selected from the group consisting of polyvinyl butyral, polyurethane, polyvinyl chloride, and poly (ethylene vinyl acetate), and combinations thereof, and from about 0.5% to about 15% by weight of dispersed polyorgano silsesquioxane microspheres, wherein the sheet further comprises from about 0.1% to about 30% by weight of an additive selected from the group consisting of oxidative stabilizers, thermal stabilizers, lubricants, mold release agents, flame-retarding agents, oxidation inhibitors, dyes, pigments, coloring agents, ultraviolet light absorbers and stabilizers, nucleators, plasticizers, compatible plastics, anti-static agents, fillers, and mixtures thereof.

2. The polymer sheet of claim 1 wherein the polymer sheet comprises polyvinyl butyral.

3. The polymer sheet of claim 1 comprising from about 60% to about 80% by weight of polyvinyl butyral.

4. The polymer sheet of claim 3 comprising from about 15% to about 30% by weight of plasticizer.

5. The polymer sheet of claim 4 comprising from about 1% to about 10% by weight of polymethyl silsesquioxane microspheres.

6. The polymer sheet of claim 5 wherein the microspheres have a mean particle size of equal to or less than about 4.0 microns.

7. A rear projection screen comprising:
a) a first glass plate;
b) a second glass plate; and
c) a polymer sheet layer disposed between the first glass plate and the second glass plate, said polymer sheet comprising a mixture of from about 85% to about 99.5% by weight of a thermoplastic polymer compound selected from the group consisting of polyvinyl butyral, polyurethane, polyvinyl chloride, and poly (ethylene vinyl acetate), and combinations thereof, and from about 0.5% to about 15% by weight of dispersed polyorgano silsesquioxane microspheres, wherein the sheet further comprises from about 0.1% to about 30% by weight of an additive selected from the group consisting of oxidative stabilizers, thermal stabilizers, lubricants, mold release agents, flame-retarding agents, oxidation inhibitors, dyes, pigments, coloring agents, ultraviolet light absorbers and stabilizers, nucleators, plasticizers, compatible plastics, anti-static agents, fillers, and mixtures thereof.

8. The projection screen of claim 7 comprising a light absorbing or anti-reflection layer.

9. The projection screen of claim 8 wherein the light absorbing or anti-reflection layer is a gray glass, a gray polymer layer or film, an anti-reflective coating, or an etched glass, or combinations thereof.

10. The projection screen of claim 7 wherein the first glass plate has a low iron oxide content.

11. The projection screen of claim 10 wherein the second glass plate is silicate glass.

12. The projection screen of claim 7 wherein the polymer sheet comprises polyvinyl butyral.

13. The projection screen of claim 12 comprising polymethyl silsesquioxane microspheres having a mean particle size of equal to or less than about 4.0 microns.

14. The projection screen of claim 13 comprising from about 60% to about 80% by weight of polyvinyl butyral, from about 15% to about 30% by weight of plasticizer, and from about 1% to about 10% by weight of polymethyl silsesquioxane microspheres.

15. The projection screen of claim 14 comprising a light absorbing or anti-reflection layer which is a gray glass, a gray polymer layer or film, an anti-reflective coating, or an etched glass, or combinations thereof.

16. The projection screen of claim 15 wherein the first glass plate has a low iron oxide content and the second glass plate is silicate glass.

17. A rear projection screen comprising:
a) a first glass plate;
b) a second glass plate;
c) a polymer sheet layer disposed between the first glass plate and the second glass plate, said polymer sheet comprising a mixture of from about 85% to about 99.5% by weight of a polyvinyl butyral compound and from about 0.5% to about 15% by weight of dispersed polymethyl silsesquioxane microspheres, wherein the sheet further comprises from about 0.1% to about 30% by weight of an additive selected from the group consisting of oxidative stabilizers, thermal stabilizers, lubricants, mold release agents, flame-retarding agents, oxidation inhibitors, dyes, pigments, coloring agents, ultraviolet light absorbers and stabilizers, nucleators, plasticizers, compatible plastics, anti-static agents, fillers, and mixtures thereof; and
d) a light absorbing or anti-reflection layer.

18. The projection screen of claim 17 wherein the light absorbing or anti-reflection layer is a gray glass, a gray polymer layer or film, an anti-reflective coating, or an etched glass, or combinations thereof.

19. The projection screen of claim 18 wherein the first glass plate has a low iron oxide content and the second glass plate is gray silicate glass.

20. The projection screen of claim 19 wherein the polymer sheet comprises polyvinyl butyral.

* * * * *